(12) United States Patent
Lee et al.

(10) Patent No.: US 11,272,106 B1
(45) Date of Patent: Mar. 8, 2022

(54) METHOD AND APPARATUS FOR IMAGE ACQUISITION INCLUDING IMAGE SENSOR

(71) Applicant: SAMSUNG ELECTRONICS CO., LTD., Suwon-si (KR)

(72) Inventors: Sujin Lee, Yongin-si (KR); Eunhee Kang, Suwon-si (KR); Kinam Kwon, Suwon-si (KR); Hyong Euk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/230,000

(22) Filed: Apr. 14, 2021

(30) Foreign Application Priority Data

Aug. 31, 2020 (KR) .................. 10-2020-0110128

(51) Int. Cl.
*H04N 5/232* (2006.01)
*H04N 5/225* (2006.01)

(52) U.S. Cl.
CPC ....... *H04N 5/23267* (2013.01); *H04N 5/2251* (2013.01)

(58) Field of Classification Search
CPC ............... G06K 9/6256; G06K 9/6857; G06T 2207/10016; G06T 2207/20084; G06T 2207/20212; G06T 2207/20221; G06T 3/0093; G06T 3/4046; G06T 3/4053; G06T 5/003; G06T 5/50; G02F 1/13476; H04N 7/144; H04N 5/23267; H04N 5/2251
See application file for complete search history.

(56) References Cited

U.S. PATENT DOCUMENTS

| | | | |
|---|---|---|---|
| 7,756,407 B2 | 7/2010 | Raskar | |
| 8,154,582 B2 * | 4/2012 | Border | H04N 7/144 348/14.08 |
| 8,345,129 B2 * | 1/2013 | Kanade | H04N 7/144 348/246 |
| 9,582,726 B2 | 2/2017 | Pan et al. | |
| 10,432,872 B2 * | 10/2019 | Evans, V | G06K 9/00885 |
| 10,467,729 B1 | 11/2019 | Perera et al. | |
| 10,536,622 B2 | 1/2020 | Shimada | |
| 2016/0150161 A1 | 5/2016 | Irie et al. | |

(Continued)

FOREIGN PATENT DOCUMENTS

| | | |
|---|---|---|
| CN | 107071244 A | 8/2017 |
| CN | 108769304 A | 11/2018 |

(Continued)

OTHER PUBLICATIONS

Zhou, et al. "Image restoration for under-display camera." *arXiv preprint arXiv*: (Mar. 10, 2020)

(Continued)

*Primary Examiner* — Amy R Hsu
(74) *Attorney, Agent, or Firm* — NSIP Law

(57) ABSTRACT

An image acquisition apparatus includes a display layer including hole regions through which external light is received and pixel regions arranged between the hole regions, an image sensor disposed under the display layer and configured to generate a raw image by sensing the external light received through the hole regions, and a processor configured to perform image processing on the raw image based on blur information based on an arrangement of the hole regions.

36 Claims, 13 Drawing Sheets

(56) References Cited

U.S. PATENT DOCUMENTS

| | | |
|---|---|---|
| 2017/0091951 A1 | 3/2017 | Yoo et al. |
| 2017/0104897 A1 | 4/2017 | Kang et al. |
| 2019/0139205 A1 | 5/2019 | El-Khamy et al. |
| 2019/0188555 A1 | 6/2019 | Roh et al. |
| 2021/0176383 A1* | 6/2021 | Kim ..................... H04N 5/332 |

FOREIGN PATENT DOCUMENTS

| | | |
|---|---|---|
| CN | 110365819 A | 10/2019 |
| EP | 3 550 551 A2 | 10/2019 |
| EP | 3 605 510 A1 | 2/2020 |
| JP | 2000-298253 A | 10/2000 |
| KR | 10-1725044 B1 | 4/2017 |

OTHER PUBLICATIONS

Extended European Search Report dated Nov. 10, 2021 in counterpart European Patent Application No. 21178604.1 (7 pages in English).

\* cited by examiner

METHOD AND APPARATUS FOR IMAGE ACQUISITION INCLUDING IMAGE SENSOR

CROSS-REFERENCE TO RELATED APPLICATIONS

This application claims the benefit under 35 USC § 119(a) of Korean Patent Application No. 10-2020-0110128 filed on Aug. 31, 2020, and Korean Patent Application No. 10-2021-0031386 filed on Mar. 10, 2021, in the Korean Intellectual Property Office, the entire disclosure of which is incorporated herein by reference for all purposes.

BACKGROUND

1. Field

The following description relates to a method and apparatus for image acquisition including an image sensor.

2. Description of Related Art

A camera, a device configured to capture an image, is widely equipped in various electronic devices. A camera has become an essential part of a mobile device, such as a smartphone, and becomes more advanced and smaller in size over time. In general, a smartphone may include a front camera and a rear camera. The front camera may disposed at the upper end of the smartphone for capturing a user's selfie.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image acquisition apparatus includes a display layer including hole regions through which external light is received and pixel regions arranged between the hole regions, an image sensor disposed under the display layer and configured to generate a raw image by sensing the external light received through the hole regions, and a processor configured to perform image processing on the raw image based on blur information based on an arrangement of the hole regions.

Each of the hole regions may be arranged between a subset of the pixel regions in the display layer, and be arranged such that a minimum distance between a boundary of a hole region and a boundary of a pixel region is within $\frac{1}{5}$ of a diameter of the hole region.

Each of the hole regions may be circular and the hole regions may be the same in shape and size.

Each of the hole regions may be greater in size than each of the pixel regions, and the hole regions may be separated from each other.

The processor may generate a preprocessed image by performing image preprocessing on the raw image, and generate an enhanced image by performing image restoration on the preprocessed image.

The processor may be further configured to generate the preprocessed image by performing either one or both of image preprocessing configured to apply a filter to the raw image and image preprocessing configured to perform image deconvolution on the raw image.

The processor may be further configured to obtain the enhanced image using a neural network-based image restoration model configured to use the preprocessed image as an input.

The blur information may be determined based on any one or any combination of any two or more of a size, a shape, a depth, or an arrangement of the hole regions.

The blur information may include information associated with a blur of the raw image that is determined by at least one of the shape, size, depth, or interval of the hole regions.

A spacing between centers of neighboring ones of the hole regions may be substantially equal to a diameter of any one of the hole regions.

A ratio of a spacing between centers of neighboring ones of the hole regions and a diameter of any one of the hole regions may be substantially equal to 1.

In another general aspect, an image acquisition apparatus includes a display layer including pixel regions and hole regions of a circular form configured to allow external light to be received therethrough, and an image sensor disposed under the display layer and configured to generate an image by sensing the external light. Each of the hole regions is arranged between a subset of the pixel regions in the display layer. The hole regions and the pixel regions are alternately arranged in the display layer, and the hole regions are each of a same shape and size.

Neighboring hole regions may be separated from each other with a wiring region for wiring therebetween, and four hole regions may be arranged to surround a single pixel region.

In another general aspect, an image sensor includes a processor configured to generate a raw image based on external light received through hole regions comprised in a display layer, and perform image processing on the raw image based on blur information based on an arrangement of the hole regions.

Each of the hole regions may be arranged between a subset of pixel regions in the display layer, and be arranged such that a minimum distance between a boundary of a hole region and a boundary of a pixel region is within $\frac{1}{5}$ of a diameter of the hole region. Each of the hole regions may be greater in size than each of the pixel regions, and the hole regions may be separated from each other.

In another general aspect, an electronic apparatus includes a display panel including a display layer having hole regions through which external light is received and pixel regions for outputting a display image, an image sensor disposed under the display panel and configured to generate a raw image by sensing the external light, a processor configured to generate an enhanced image by performing image processing on the raw image based on blur information based on an arrangement of the hole regions, and a storage configured to store either one or both of the raw image and the enhanced image.

Each of the hole regions may be arranged between a subset of the pixel regions in the display layer. Each of the hole regions may be greater in size than each of the pixel regions, and the hole regions are separated from each other.

In another general aspect, a method of operating an image acquisition apparatus, includes obtaining a raw image by sensing external light received through hole regions arranged in a display layer using an image sensor disposed under the display layer, and performing image processing on the raw image based on blur information based on an arrangement of the hole regions.

The performing of the image processing may include generating a preprocessed image by performing image preprocessing on the raw image, and generating an enhanced image by performing image restoration on the preprocessed image.

The generating of the preprocessed image may include generating the preprocessed image by performing either one or both of image preprocessing configured to apply a filter to the raw image and image preprocessing configured to perform image deconvolution on the raw image.

The performing of the image processing may include obtaining the enhanced image using a neural network-based image restoration model using the preprocessed image as an input.

A non-transitory computer-readable storage medium may store instructions that, when executed by one or more processors, cause the one or more processors to perform the method above.

In another general aspect, an image acquisition apparatus include a display layer comprising hole regions and pixel regions arranged in a predetermined pattern, an image sensor disposed under the display layer and configured to generate a raw image by capturing light through the hole regions, and a processor configured to process the raw image based on blur information of the hole regions.

The predetermined pattern may include a subset of the hole regions surrounding each of the pixel regions.

The predetermined pattern may include the hole regions interleaved with the pixel regions.

Each of the hole regions may be circular, the hole regions may be of a same shape and size, and each of the hole regions may be greater in size than each of the pixel regions.

Each of the hole regions may be a micro-hole region.

The blur information may be determined based on any one or any combination of any two or more of a size, a shape, a depth, an arrangement of the hole regions, or a point spread function (PSF) based on the arrangement of the hole regions.

The display layer may be included in a display panel of an electronic apparatus.

A spacing between centers of neighboring ones of the hole regions may be substantially equal to a diameter of any one of the hole regions.

A ratio of a spacing between centers of neighboring ones of the hole regions and a diameter of any one of the hole regions may be substantially equal to 1.

The processor may be further configured to generate a preprocessed image by performing either one or both of image preprocessing configured to apply a filter to the raw image and image preprocessing configured to perform image deconvolution on the raw image.

The raw image may be a demosaiced red green blue (RGB) image.

The processor may be further configured to generate an enhanced image by performing image restoration on the preprocessed image.

The enhanced image may be generated using a neural network-based image restoration model configured to use the preprocessed image as an input.

The image processing apparatus may further include an image signal processor (ISP) configured to perform any one or any combination of any two or more of noise reduction, white detect correction, RGB shading, RGB interpolation, color correction, and image format conversion on the enhanced image.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
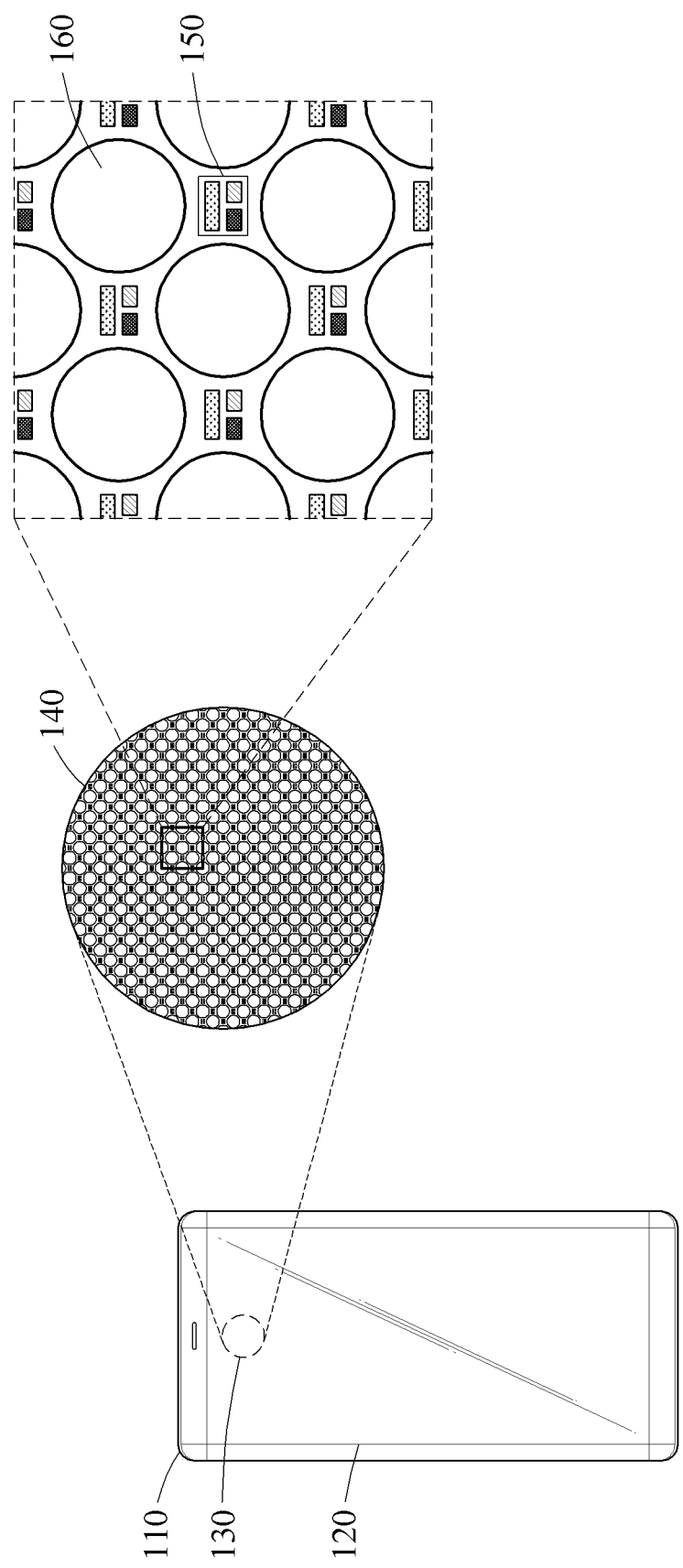
FIG. 1 illustrates an example of an electronic apparatus having an image acquisition apparatus and an example of an enlarged capturing region on a display screen.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of an electronic apparatus having an image acquisition apparatus and an example of an enlarged capturing region on a display screen.

In FIG. 1, an image acquisition apparatus configured to obtain image data by capturing an image may operate by being embedded in an electronic apparatus 110. The image acquisition apparatus may operate by being embedded in the electronic apparatus 110 including a display 120. As the electronic apparatus 110, any type of electronic apparatus including a display may be used unrestrictedly. The use of the term 'may' herein with respect to an example or embodiment, e.g., as to what an example or embodiment may include, implement, or achieve means that at least one example or embodiment exists with such a feature, implementation, or achievement, while also noting that all examples and embodiments are not limited thereto and alternate examples or embodiments may also exist.

A camera of the image acquisition apparatus that receives external light may not be externally exposed but disposed inside the electronic apparatus 110. The camera of the image acquisition apparatus may be disposed under the display 120 of the electronic apparatus 110. An image acquisition apparatus with a camera disposed as described above is also referred to as an under-display camera (UDC). Since the camera is disposed inside the electronic apparatus 110, it is possible to include a region where the camera is disposed as a display region. Thus, it is possible to implement a quadrangular display without a need to implement a notch-type display or dispose an independent camera region inside a display region.

For example, in an example where an image sensor is disposed inside one region 130 of the display 120, a display layer 140 corresponding to the region 130 may include a plurality of pixel regions 150 and a plurality of hole regions 160, each being of a circular form, as illustrated in FIG. 1. However, the form of the hole regions 160 is not limited to the illustrated circular, and the hole regions 160 may be embodied in various forms, such as, for example, an elliptic form and a quadrangular form. A hole region described herein is also referred to as a micro-hole region. The arrangement pattern of the pixel regions 150 and the hole regions 160 may be duplicated in the display layer 140 corresponding to the region 130. As illustrated, each of the hole regions 160 may be arranged between the pixel regions 150 and arranged near the pixel regions 150. In an example, a hole region 160 may be arranged such that a minimum distance between a boundary of the hole region 160 and a boundary of a pixel region 150 is within ⅕ of a diameter of the hole region 160. However, the detailed numerical value, ⅕, is provided merely as an example, and thus the scope of examples is not limited thereto.

The image acquisition apparatus may obtain image data based on external light received through the hole regions 160 of the display layer 140. An image may be output through or displayed on the pixel regions 150, including other pixel regions included in another region of the display 120. The display layer 140, a component included in a display panel, may be a layer in which the pixel regions 150 are arranged in a redetermined pattern. As illustrated, the hole regions 160 through which external light pass into the electronic apparatus 110 may be present only in the region 130 in which the image acquisition apparatus is disposed. Although the region 130 and the display layer 140 in which the hole regions 160 are arranged are illustrated in a circular form, the region 130 and the display layer 140 may also be provided in various forms.

Figure 2:
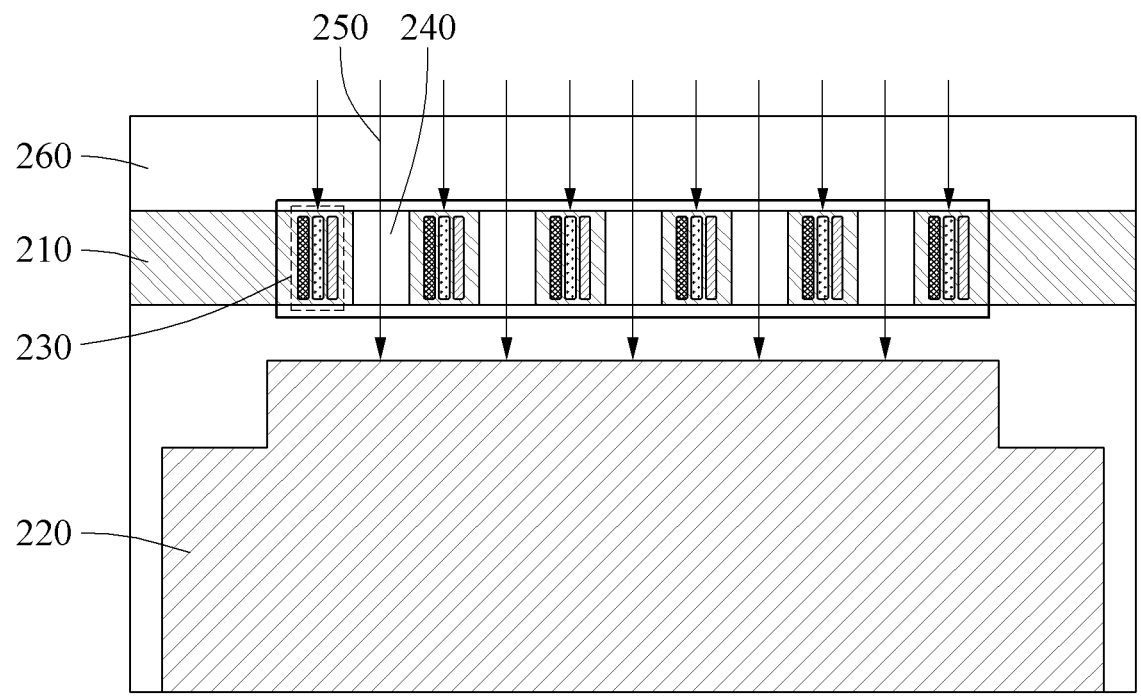
FIG. 2 illustrates an example of a structure of an image acquisition apparatus.

FIG. 2 illustrates an example of a structure of an image acquisition apparatus.

FIG. 2 depicts an example of a cross-section of the region 130 of the electronic apparatus 110 of FIG. 1. In FIG. 2, an image acquisition apparatus includes a display layer 210 and an image sensor 220. The display layer 210 includes a plurality of pixel regions 230 configured to output a color and a plurality of hole regions 240 of a circular form that allows external light 250 to be received therethrough. The pixel regions 230 and the hole regions 240 may be alternately arranged on the display layer 210 in the region 130 of the electronic apparatus 110 of FIG. 1. The remaining region of the display layer 210, from which the hole regions 240 are excluded, may all be configured to inhibit light from passing therethrough. Thus, external light 250 may only reach the image sensor 220 after passing through the hole regions 240.

On the display layer 210, a protective layer 260 of a transparent or translucent material is disposed to protect the display layer 210. The protective layer 260 may be formed with tempered glass or reinforced plastic, for example. In addition, the display layer 210 may include other components to implement a display panel in addition to the pixel regions 230. A display including such pixel regions 230 may be embodied by a display type, such as, for example, a liquid crystal display (LCD) and an organic light-emitting diode (OLED).

The image sensor 220 may be disposed under the display layer 210 and configured to generate a raw image by sensing the external light 250 received through the hole regions 240. According to examples, the image sensor 220 may be designed to be ultra-small and provided as a plurality of image sensors. For example, the raw image, which is generated by the image sensor 220 through light passing through the hole regions 240, may include a demosaiced red, green, blue (RGB) image. The external light 250 reaching the image sensor 220 may be a portion of light incident on the display layer 210 and passing through the hole regions 250. Thus, the raw image obtained by the image sensor 220 may have an image quality level that is less than a desired image quality level. For example, the raw image may have a relatively low level of brightness and a relatively significant amount of noise due to occlusion by the pixel regions 230. In addition, the hole regions 240 may act as slits, and there may thus be artifacts in the raw image due to a diffraction effect. For example, the raw image may have a blur or a flare.

Due to such image quality degrading factors, image processing in a structure such as a UDC may be desired to enhance the raw image obtained by the image sensor 220. The image acquisition apparatus may further include a processor configured to perform such image processing. According to examples, the image processing may be performed in the image sensor 220. The image processing may include restoring the raw image obtained by the image sensor 220 to have a similar image quality to that of a typical image captured by a camera that does not include hole regions 240. The image acquisition apparatus may perform such image restoration by processing the image based on an arrangement (e.g., a shape, size, depth, interval, etc. of the hole regions 240) of the hole regions 240, and may thus provide a high-definition clear image even in an environment using the UDC.

The arrangement of the hole regions 240 included in the display layer 210 may be determined based on the shape, size, depth, interval, and the like of each of the hole regions 240. It may be an arrangement optimized for the image processing or optimized to reduce the image quality degrading factors in the raw image. Such an optimized arrangement may be determined based on a blur characteristic exhibited by the arrangement of the hole regions 240. Examples of the arrangement of the hole regions 240 will be described hereinafter with reference to FIGS. 3 and 4.

Figure 3:
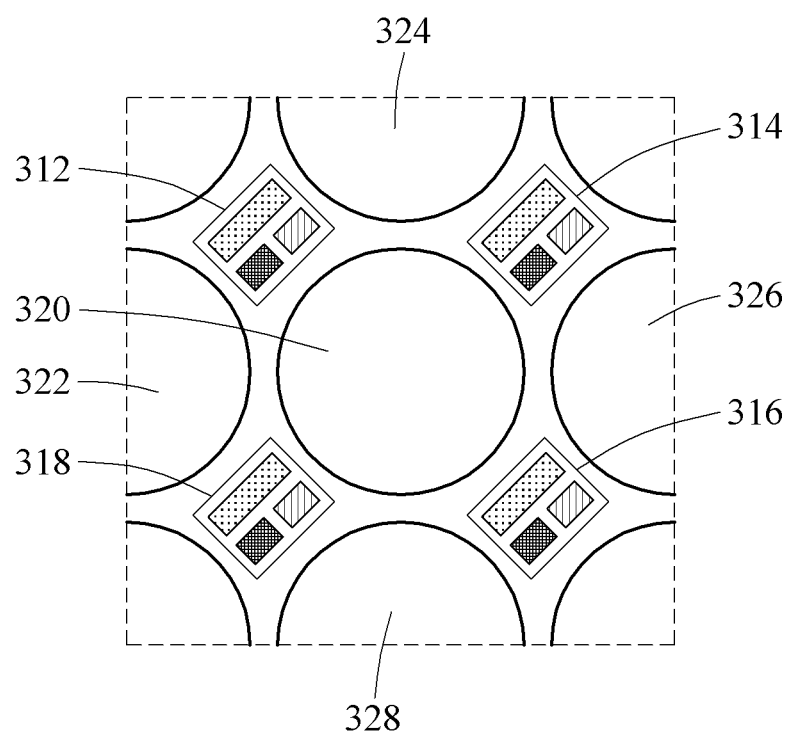
FIGS. 3 and 4 illustrate an arrangement of hole regions arranged in a display layer.
Figure 4:
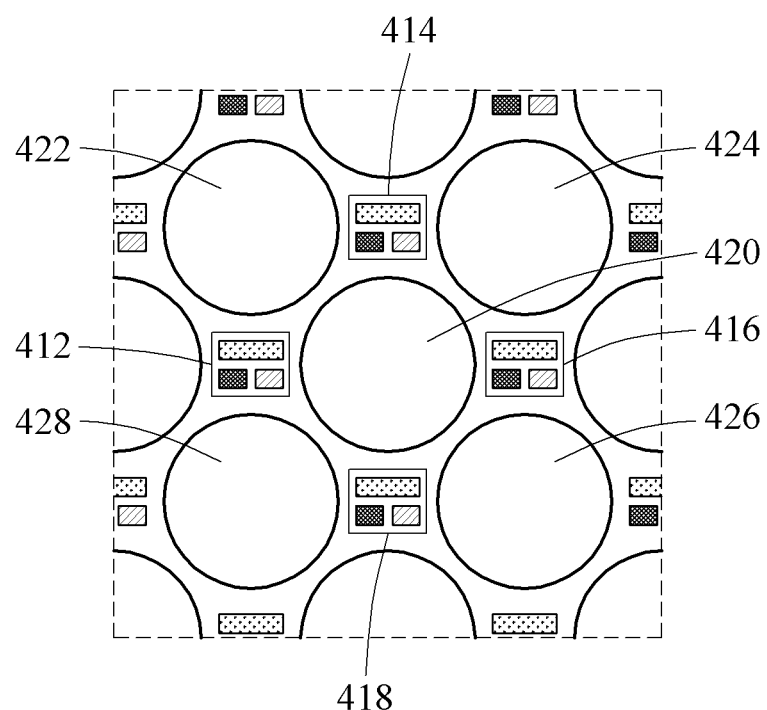

FIGS. 3 and 4 illustrate a portion of a display layer in which a plurality of hole regions is arranged but there may be different arrangements of the hole regions in other examples.

In FIG. 3, a plurality of pixel regions 312, 314, 316, and 318 are arranged throughout a display layer, and a plurality of hole regions 320, 322, 324, 326, and 328 are arranged only in a portion of the display layer. In the display layer, the hole regions 320, 322, 324, 326, and 328 and the pixel regions 312, 314, 316, and 318 may be alternately arranged.

For example, each of the hole regions 320, 322, 324, 326, and 328 may have a circular contour, and have the same shape and size. For example, the hole region 320 of a single circular form may be arranged among the pixel regions 312, 314, 316, and 318. Each hole region may be arranged near to four pixel regions along with four other hole regions in the display layer. For example, the hole region 320 may be arranged near to the other hole regions 322, 324, 326, and 328, and to the pixel regions 312, 314, 316, and 318. Neighboring hole regions may be separated from one another by a wiring region for wiring therebetween, and four hole regions may be arranged to surround a single pixel region. The hole regions 320, 322, 324, 326, and 328 may be designed to have a maximum size in a region in the display layer from which the pixel regions 312, 314, 316, and 318 and the wiring region are excluded. The hole regions 320, 322, 324, 326, and 328 may be arranged near the pixel regions 312, 314, 316, and 318. For example, the hole region 320 may be arranged such that a minimum distance between a boundary of the hole region 320 and a boundary of each of the pixel regions 312, 314, 316, and 318 that is near the hole region 320 is within ⅕ of a diameter of the hole region 160.

FIG. 4 illustrates another example of an arrangement of a plurality of hole regions in a display layer. In FIG. 4, similar to the example arrangement illustrated in FIG. 3, a plurality of hole regions 420, 422, 424, 426, and 428 and a plurality of pixel regions 412, 414, 416, and 418 may be alternately arranged in a display layer. The hole regions 420, 422, 424, 426, and 428 each provided in a circular form may have the same shape and size. Each of the hole regions 420, 422, 424, 426, and 428 may be arranged near four neighboring hole regions and four pixel regions. The hole regions 420, 422, 424, 426, and 428 may be identified from each other by a wiring region therebetween, and may be designed to have a maximum size in a region from which the pixel regions 412, 414, 416, and 418 and the wiring region are excluded.

As described above with respect to FIGS. 3 and 4 and the example arrangements of hole regions, it is possible to allow more external light to be received through hole regions of a maximum size. It is thus possible to obtain a high-brightness raw image based on the configuration of the hole regions. In addition, through an arrangement structure in which hole regions of the same size and shape are arranged near one another, it is possible to reduce the degradation of an image quality that may occur due to diffraction. An optimal arrangement structure for hole regions may be obtained by a process of determining a basic form of a hole region of a curved shape in a state in which pixel regions satisfying a given display requirement are arranged in a display layer, a process of arranging a hole region between pixel regions arranged farthest among neighboring pixel regions and pixel regions arranged near to a current pixel region, a process of increasing a size of arranged hole regions until the hole regions are to be within a preset distance from a pixel region and a wiring region for wiring, and a process of blocking all micro-hole regions that may be generated by a display structure other than corresponding hole regions.

An image acquisition apparatus may generate a higher-definition image by performing image preprocessing on a raw image by considering an optical characteristic based on an arrangement structure of hole regions determined as described above, and by performing image restoration. Further details regarding such image processing will be described below.

Figure 5:
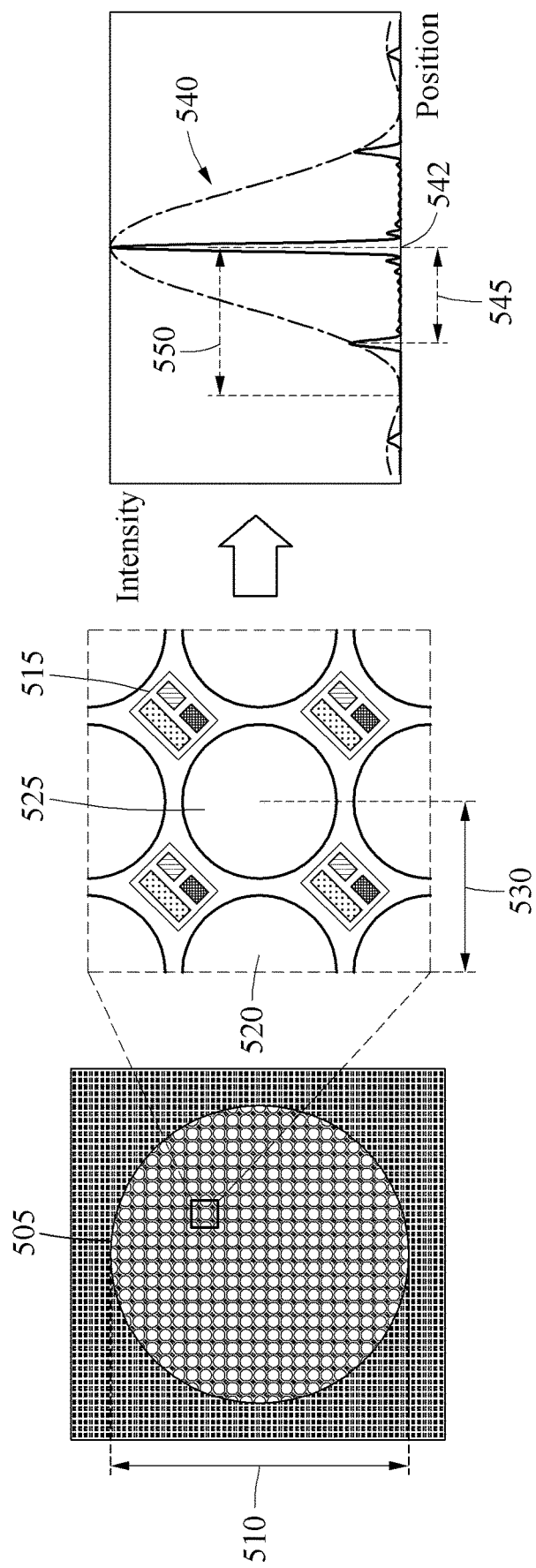
FIG. 5 illustrates a point spread function (PSF) based on an arrangement structure of hole regions.

FIG. 5 illustrates a point spread function (PSF) based on an arrangement structure of hole regions.

FIG. 5 illustrated are one region 505 having a diameter 510 in a display layer, a plurality of hole regions including hole regions 520 and 525, and a plurality of pixel regions including a pixel region 515. A blur of a raw image to be sensed by an image sensor through hole regions may be simulated as a PSF 540 based on the hole regions' arrangement structure.

The PSF 540 may be a mathematical or numerical representation indicating how a single pixel region or point to be included in the raw image spreads. Through the PSF 540, it is possible to estimate blur information to be indicated in the raw image. A shape of the PSF 540 may vary according to a size of the hole regions, a shape of the hole regions, a depth of the hole regions, an interval between the hole regions, and/or an arrangement form of the hole regions on a two-dimensional (2D) plane. For example, the size of the hole regions may determine an envelope form of the PSF 540 and a distance 550 to a main lobe. An interval 530 between the neighboring hole regions 520 and 525 may determine the position and intensity of a first side lobe. In addition, a ratio of the interval between the hole regions 520 and 525 to the size of each of the hole regions 520 and 525 may determine the intensity of the first side-lobe.

For example, as the size of the hole regions 520 and 525 increases, the distance 550 between a center 542 and the main lobe may increase, and the intensity of the first side lobe may decrease. As the interval 530 between the hole regions 520 and 525 decreases, a distance 545 between the center 542 and the first side lobe may increase, and the intensity of the first side lobe may decrease. Further details regarding the relationship between an arrangement structure of hole regions and a PSF will be described below.

Figure 6:
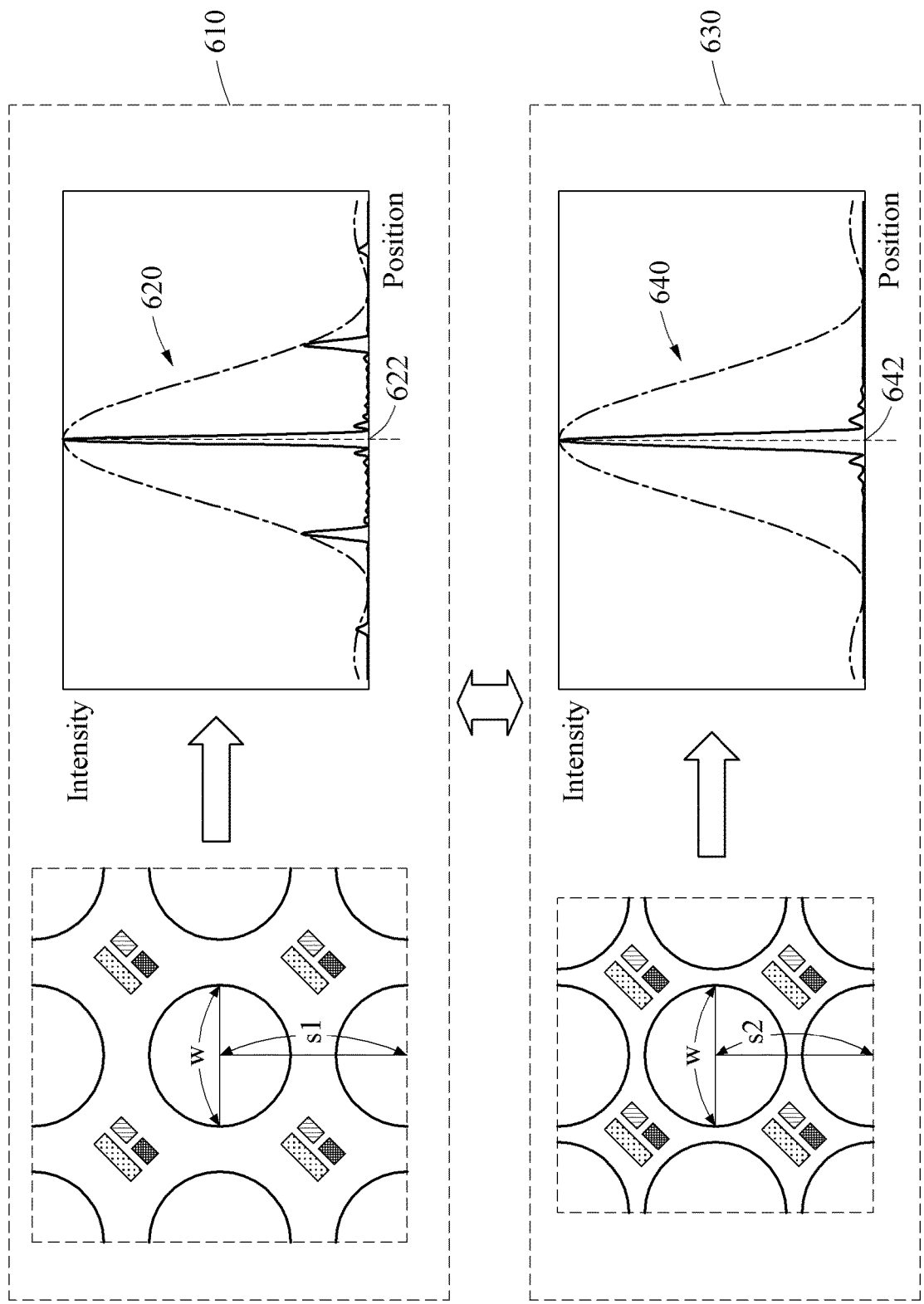
FIG. 6 illustrates an example of a change in a PSF based on an arrangement structure of hole regions.

FIG. 6 illustrates an example of a change in a PSF based on an arrangement structure of hole regions. In the example of FIG. 6, it is assumed that hole regions in cases 610 and 630 have the same diameter w, corresponding to a size of each of the hole regions in both cases 610 and 630, but the interval (or spacing) s1 between the hole regions in case 610 is greater than the interval s2 between the hole regions in case 630. It is also assumed that other conditions are the same. In the example of FIG. 6, also illustrated are PSFs 620 and 640 that are derived by simulating the arrangements of the hole regions in cases 610 and 630, respectively.

Comparing the PSFs 620 and 640, as the interval between the hole regions decreases, the distance from a center (e.g., 622, 642) to a first side lobe increases, and the intensity of the first side lobe decreases. The first side lobe indicates an element corresponding to a blur or an afterimage in a raw image, and thus the intensity of the first side lobe needs to decrease.

The envelope of a PSF may be determined by the size of a hole region. For example, in PSFs 620 and 640, since each of the hole regions have the same size, the envelope of PSFs 620 and 640 may be determined based on diameter w of any hole region of the hole regions. In PSFs 620 and 640, as the spacing s1 or s2 approaches the diameter w, or the ratio of s1/w or s2/w approaches 1, the first side lobe will approach null.

Referring back to FIG. 5, based on a relationship between the arrangement of the hole regions and the form of the PSF 540, it may be desirable that the size of each of the hole regions increases, and the interval 530 between the neighboring hole regions 520 and 525 decreases. In addition, it may be desirable that the hole regions are alternately arranged with the pixel regions and arranged near each of the pixel regions, and each has a form of a single circle. Also, when determining the arrangement of the hole regions, a margin for wiring and the like between the neighboring hole regions 520 and 525 may be considered.

From the PSF 540 based on the hole regions' arrangement structure, blur information that may be indicated in a raw image may be estimated, and an image processing method based on the arrangement structure may be employed. For example, in an example where the interval 530 between the hole regions 520 and 525 is relatively large, a strong double image may occur. In such an example, the image acquisition apparatus may remove a double image or a blur from the raw image using information associated with the PSF 540 and then perform image restoration. For another example, in an example where the interval 530 between the hole regions 520 and 525 is relatively small, strong noise and a widened blur contour may occur. In such an example, the image acquisition apparatus may perform deconvolution, or image restoration using a neural network.

Figure 7A:
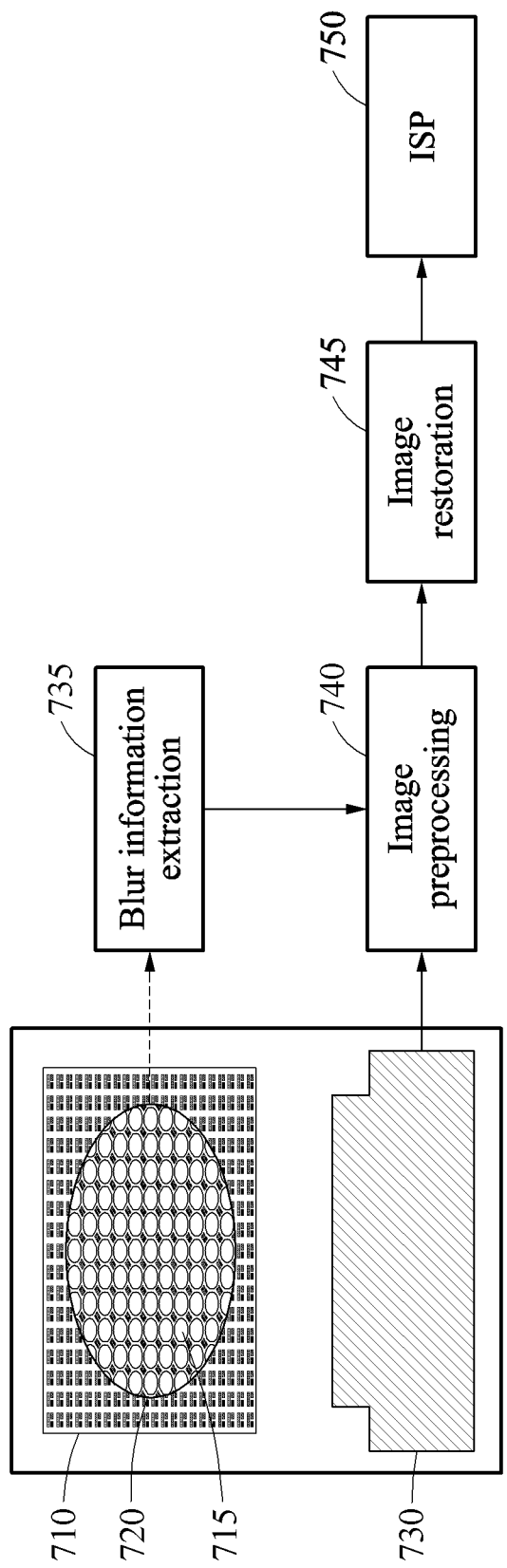
FIGS. 7A through 7C illustrate image restoration.
Figure 7B:
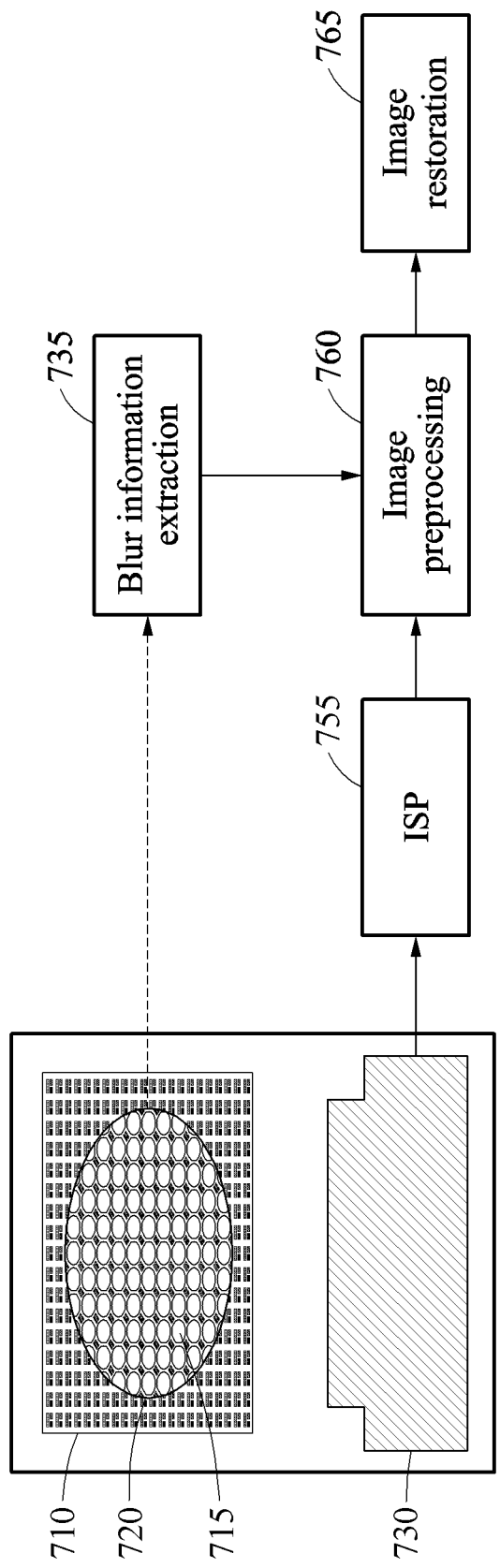
Figure 7C:
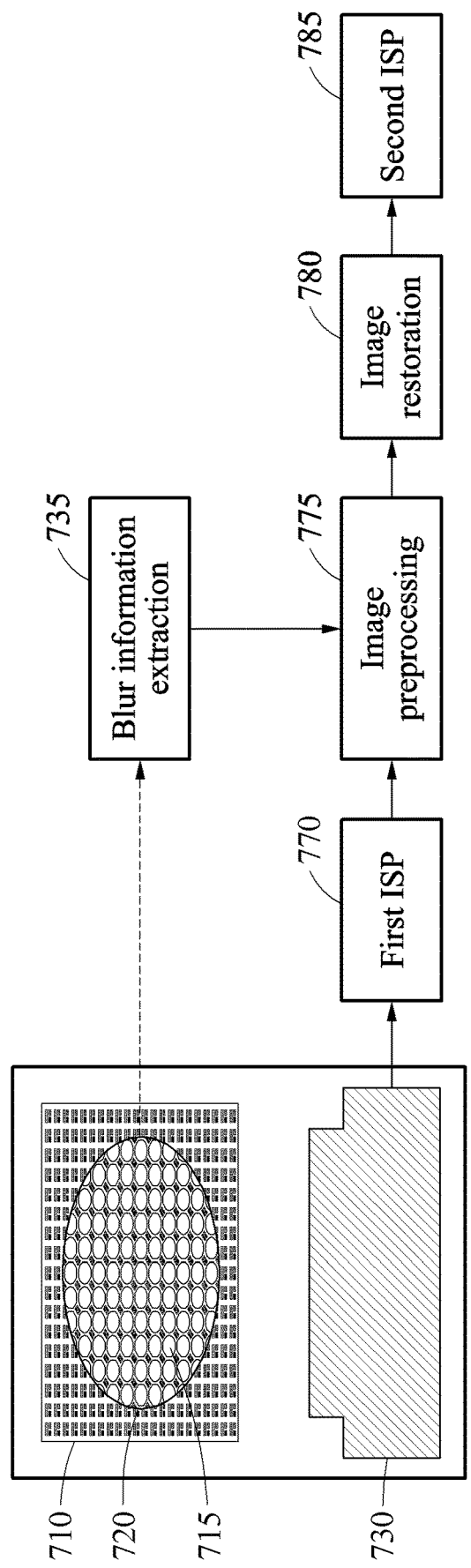

FIGS. 7A through 7C illustrate image restoration.

In FIG. 7A, under a display layer 710 in which a plurality of pixel regions 720 and a plurality of hole regions 715 are arranged, an image sensor 730 may generate raw data by sensing external light received through the hole regions 715. In operation 735, blur information is extracted from an arrangement of the hole regions 715 arranged in the display layer 710. The blur information may vary based on a shape, size, depth, and/or interval. The blur information may be obtained from a PSF determined through a simulation or an equation.

In operation 740, image preprocessing is performed on the raw data based on the blur information. The image preprocessing may include an image processing method to reduce artifacts such as a double image or a blur included in the raw data. The image preprocessing may include, for example, filtering that applies a filter to a raw image, deconvolution processing using a known kernel, or a neural network model-based method to obtain an image with a reduced double image or blur.

In operation 745, image restoration may be performed on a preprocessed image obtained through the image preprocessing. The image restoration may allow a result from the image restoration to be more similar to an image obtained by an image sensor in an environment in which there is no portion occluded by the pixel regions 720. For the image restoration, a trained neural network-based image restoration model may be used. The image restoration model may use the preprocessed image as an input and output an enhanced image obtained through the image restoration.

To obtain a desirable result from the image preprocessing and the image restoration, the size of each of the hole regions 715 arranged in the display layer 710 may need to be as large as possible, and a distance between the hole regions 715 may need to be as short as possible. The enhanced image obtained through the image restoration may be transferred to an image signal processor (ISP) 750. The ISP 750 may process the enhanced image in a desirable way. For example, the ISP 750 may perform image processing, for example, noise reduction, white detect correction, RGB shading, RGB interpolation, color correction, image format conversion, or the like.

In FIG. 7B, the image preprocessing and the image restoration that are described above may be performed after image processing is performed by an ISP 755 on a raw image. The raw image is obtained by the image sensor 730, and the obtained raw image is transferred to the ISP 755. The ISP 755 performs the image processing, for example, noise reduction, on the raw image. Subsequently, image preprocessing corresponding to operation 740 is performed on an image obtained through the image processing performed by the ISP 755 in operation 760, and then the image restoration is performed in operation 765.

In FIG. 7C, the image preprocessing and the image restoration that are described above may be performed on a raw image in operations 775 and 780 between image processing by a first ISP 770 and image processing by a second ISP 785. The raw image obtained by the image sensor 730 is transferred to the first ISP 770, and the first ISP 770 performs the image processing, for example, noise reduction, on the raw image. Subsequently, the image preprocessing is performed based on blur information in operation 775, and the image restoration is performed in operation 780. A resulting image obtained through the image restoration is transferred to the second ISP 785, and the ISP 780 performs, on the resulting image, the image processing, for example, noise reduction, white defect correction, RGB shading, RGD interpolation, color correction, image format conversion, or the like.

Figure 8:
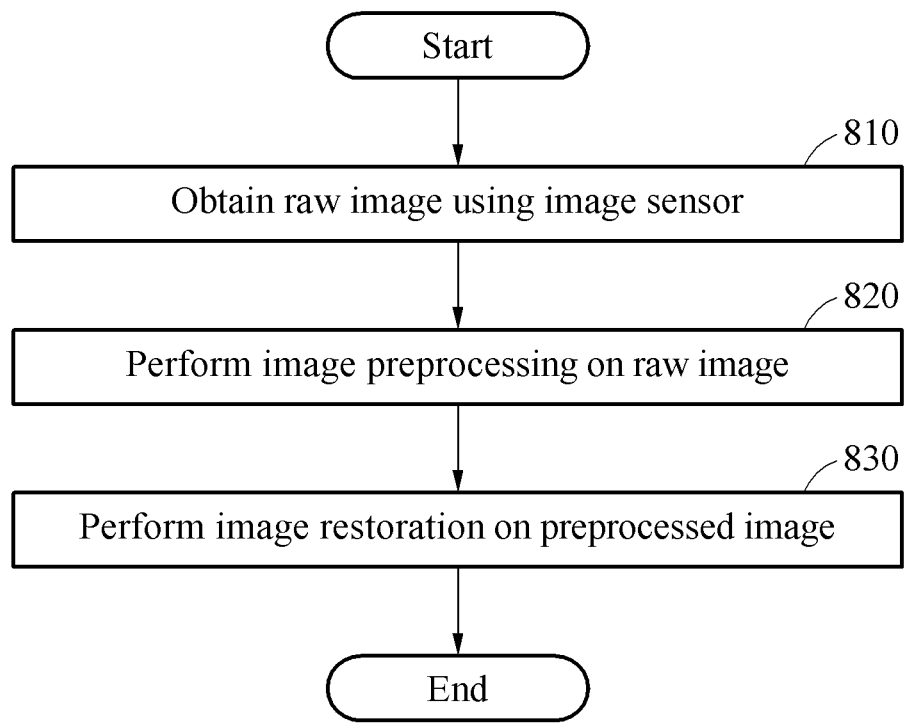
FIG. 8 illustrates an example of a flowchart of an image processing method.

FIG. 8 illustrates an example of a flowchart of an image processing method.

In FIG. 8, in operation 810, an image acquisition apparatus obtains a raw image using an image sensor. The image sensor may be disposed under a display and configured to generate the raw image by sensing external light received or captured through a plurality of hole regions of a display layer.

In operations 820 and 830, the image acquisition apparatus generates an enhanced image by performing image processing on the raw image based on blur information that is based on an arrangement of the hole regions. A structure of the arrangement of the hole regions may be determined by the shape, size, depth, and/or interval of the hole regions. In operation 820, the image acquisition apparatus generates a preprocessed image by performing image preprocessing on the raw image based on the blur information. For example, the image acquisition apparatus may generate the preprocessed image by performing at least one of image preprocessing that applies a filter to the raw image or image processing that performs image deconvolution on the raw image.

In operation 830, the image acquisition apparatus generates the enhanced image by performing image restoration on the preprocessed image. For example, the image acquisition apparatus may obtain the enhanced image using a neural network-based image restoration model using the preprocessed image as an input. The image restoration model may be a model trained to output, as output data, the enhanced image obtained through the image restoration performed on the preprocessed image when the preprocessed image is input as input data. Further details regarding the training of the image restoration model will be described below.

Figure 9:
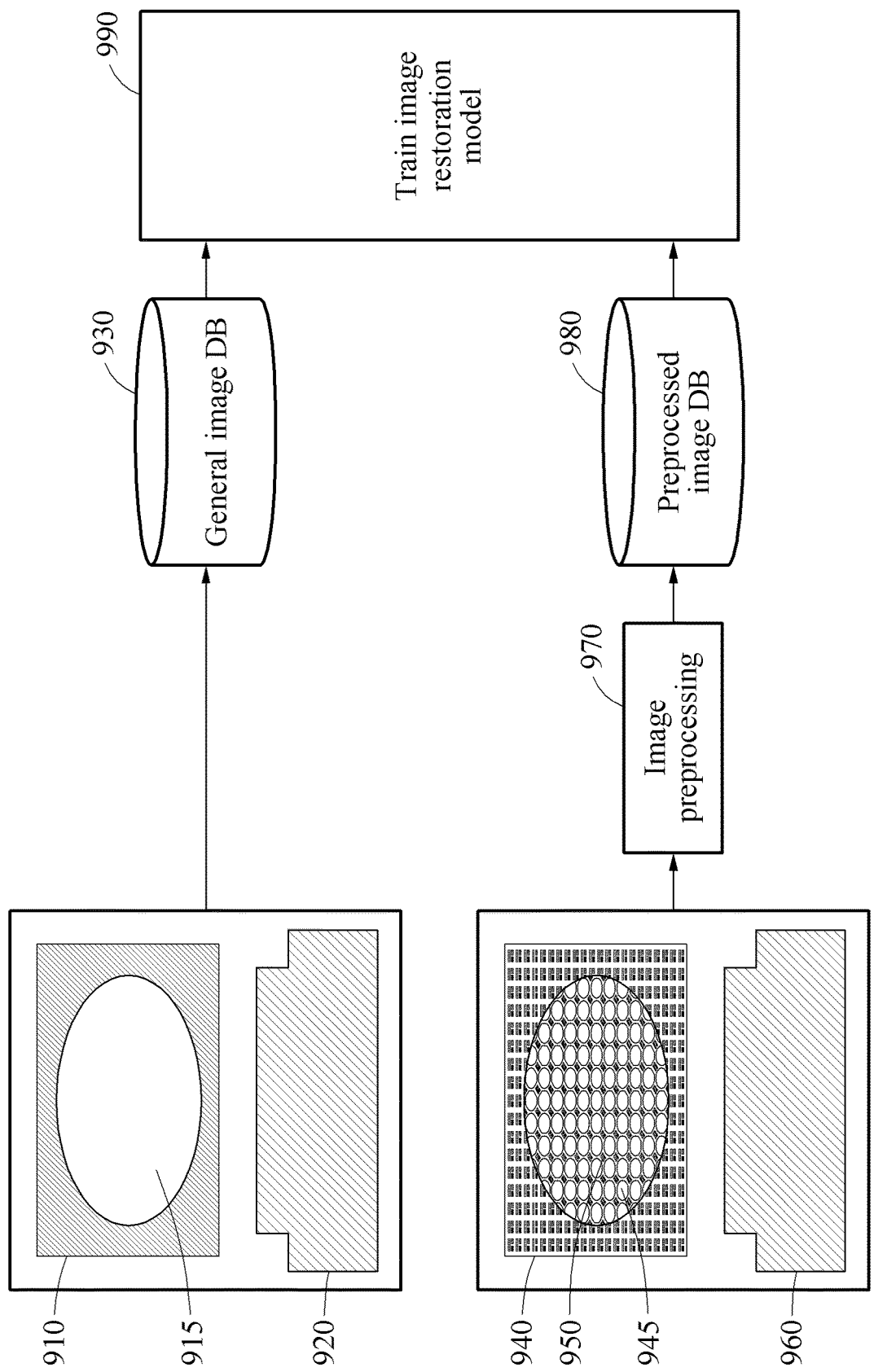
FIG. 9 illustrates an example of training an image restoration model.

FIG. 9 illustrates an example of training an image restoration model.

In FIG. 9, a neural network-based image restoration model may be trained based on a typical image and a preprocessed image. The typical image may be generated as an image sensor 920 senses external light received through a display layer 910 in which a main aperture 915, not micro-hole regions, is present. The typical image generated as described in the foregoing may be stored in a typical image database (DB) 930.

A raw image may be obtained as an image sensor 960 senses external light received through a plurality of hole regions 945 of a display layer 940 in which the hole regions 945 and a plurality of pixel regions 950 are alternately arranged. An arrangement of the hole regions 945 and the pixel regions 950 in the display layer 940 may be the same as described above with respect to the accompanying drawings. The image sensor 960 may be the same as the image sensor 920. In the example of FIG. 9, it is assumed that the image sensors 920 and 960 have no other differences in obtaining an image, except a difference between the display layers 910 and 940. In operation 970, image preprocessing is performed on the raw image obtained by the image sensor 960. The preprocessed image generated through such image preprocessing may be stored in a preprocessed image DB 980. The image preprocessing may be performed based on blur information obtained from an optical characteristic that is based on the arrangement of the hole regions 945, and include removing a double image from the raw image using the blur information. The blur information may include information associated with a PSF determined based on the arrangement of the hole regions 945.

In operation 990, training of the image restoration model is performed based on the typical image and the preprocessed image. The preprocessed image may be input to the image restoration model for image restoration to be performed, and a result image obtained through the image restoration may be compared to that of a typical image obtained in a typical environment. Parameters of a neural network included in the image restoration model may be updated such that a difference between the result image and the typical image defined by a loss function is reduced based on the loss function. Through such a process described above, the training may be performed such that the result image output from the image restoration model is more similar to the typical image.

The process may be performed repeatedly on a plurality of sets of training data, and the image restoration model may be updated to have more desirable results. According to examples, synthetic data obtained by artificially adding noise or a blur to the typical image may be used to train the image restoration model. For example, the synthetic data may be input to the image restoration model, and parameters of the image restoration model may be updated such that a difference between a result image output from the image restoration model and the typical image before synthesis is reduced.

Figure 10:
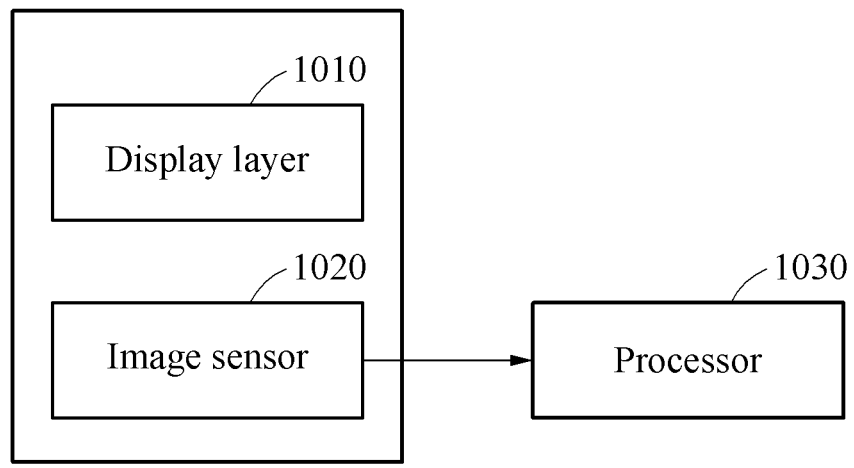
FIG. 10 illustrates an example of an image acquisition apparatus.

FIG. 10 illustrates an example of an image acquisition apparatus.

In FIG. 10, an image acquisition apparatus 1000 includes a display layer 1010, an image sensor 1020, and a processor 1030. The display layer 1010 may include a plurality of hole regions through which external light is received and a plurality of pixel regions. The pixels are arranged between the hole regions. On the display layer 1010, the hole regions and the pixel regions may be alternately arranged. Each of the hole regions may have a greater size than each of the pixel regions, and be provided in the form of a single circle. The hole regions may have the same shape and size, and be identified from each other by a wiring region therebetween.

The image sensor 1020 may be disposed under the display layer 1010, and generate a raw image by sensing the external light received through the hole regions, and transmit the generated raw image to the processor 1030. The image sensor 1020 may include a camera configured to receive external light and generate image data.

The processor 1030 may control an overall operation of the image acquisition apparatus 1000, and execute instructions to perform one or more operations described above with reference to FIGS. 1 through 9. For example, the processor 1030 may generate an enhanced image by performing image processing the raw image based on blur information that is based on an arrangement of the hole regions. The blur information may include information association with a blur of the raw image that is determined by a shape, size, depth, and/or interval of the hole regions present in the display layer 1010. The blur information may include, for example, information associated with a PSF based on a structure of the arrangement of the hole regions. The processor 1030 may generate a preprocessed image by performing image preprocessing on the raw image obtained by the image sensor 1020, and generate the enhanced image by performing image restoration on the preprocessed image. For the image preprocessing, the processor 1030 may perform image preprocessing that applies a filter to the raw image and/or image preprocessing that performs image deconvolution on the raw image to generate the preprocessed image. The processor 1030 may obtain the enhanced image using a neural network-based image restoration model that uses the preprocessed image as an input.

Figure 11:
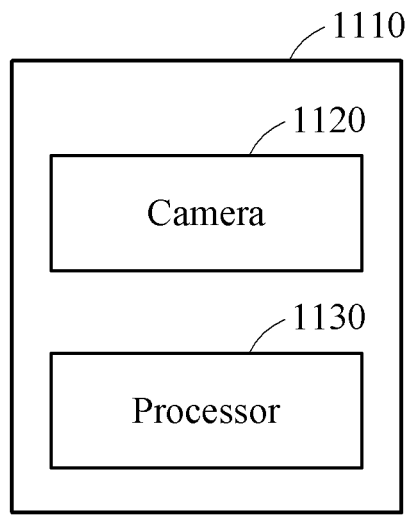
FIG. 11 illustrates an example of an image sensor.

FIG. 11 illustrates an example of an image sensor.

In an example, an image sensor 1110 may not only obtain a raw image but also generate an enhanced image by performing image processing on the obtained raw image. Thus, the enhanced image may be output from the image sensor 1110.

In FIG. 11, the image sensor 1110 includes a camera 1120 and a processor 1130. The camera 1120 may generate a raw image by sensing external light received through a plurality of hole regions included in a display layer. In the display layer, the hole regions and a plurality of pixel regions may be alternately arranged. Each of the hole regions may have a greater size than each of the pixel regions, and the hole regions may be identified from each by a wiring region therebetween. For example, each of the hole regions may be arranged near to four pixel regions along with four other hole regions.

The processor 1130 may generate an enhanced image by performing image processing on the raw image based on blur information that is based on an arrangement of the hole regions. The processor 1130 may perform image preprocessing, for example, filtering, on the raw image obtained by the camera 1120, and perform image restoration on a preprocessed image obtained through the image preprocessing based on a neural network-based image restoration model. As a result of the image restoration, the enhanced image may be generated.

Figure 12:
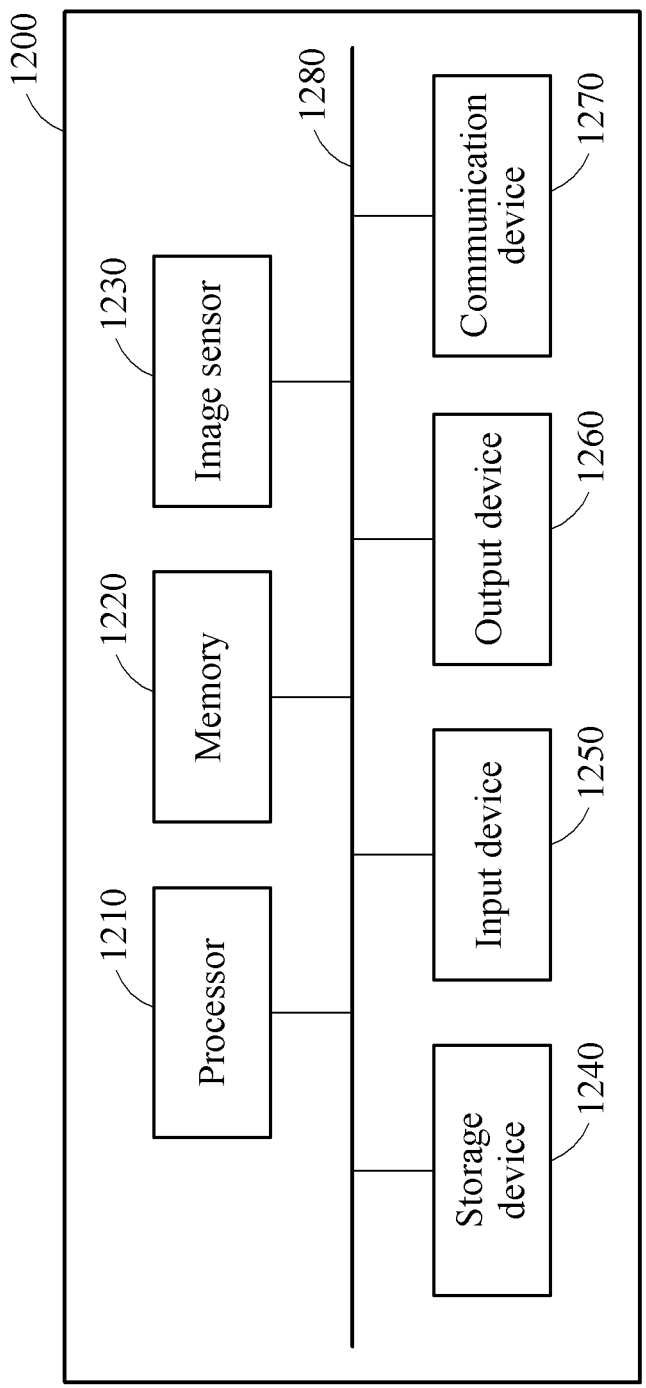
FIG. 12 illustrates an example of an electronic apparatus.

FIG. 12 illustrates an example of an electronic apparatus.

An electronic apparatus 1200, which is an apparatus including a display, may be, for example, a smartphone, a tablet computer, a wearable device, a netbook, a laptop, or the like. In FIG. 12, the electronic apparatus 1200 includes a processor 1210, a memory 1220, an image sensor 1230, a storage device 1240, an input device 1250, an output device 1260, and a communication device 1270. Such components of the electronic apparatus 1200 may communicate with one another through a communication bus 1280. The electronic apparatus 1200 may perform all the functions of the image acquisition apparatus 1000 described above with reference to FIG. 10.

The processor 1210 may control an overall operation of the electronic apparatus 1200 and execute functions and instructions to be performed in the electronic apparatus 1200. The processor 1210 may perform one or more, or all, of operations or methods described above with reference to FIGS. 1 through 11. The processor 1210 may generate an enhanced image by performing image processing on a raw image obtained through the image sensor 1230. For example, the processor 1210 may generate the enhanced image by performing image preprocessing and image restoration on the raw image based on blur information that is based on an arrangement of hole regions in a display layer.

The memory 1220 may store information necessary for the processor 1210 to perform its processing operation. For example, the memory 1220 may store instructions to be executed by the processor 1210, and store related information during the execution of software or an application in the electronic apparatus 1200. The memory 1220 may include, for example, a random-access memory (RAM), a dynamic RAM (DRAM), a static RAM (SRAM), or other types of nonvolatile memory that are well-known in the related technical field.

The image sensor 1230 may be disposed under a display panel, including the display layer, and configured to generate the raw image by sensing external light received through the hole regions arranged in the display layer. The image sensor 1230 may include a camera to receive the external light, and may also perform image processing on the raw image according to examples.

The storage device 1240 may include a computer-readable storage medium or device, and store the raw image and the enhanced image. The storage device 1240 may include, for example, a storage, a magnetic hard disk, an optical disc, a flash memory, an electrically erasable programmable read-only memory (EEPROM), or the like.

The input device 1250 may receive, from a user, an input, for example, a tactile input, a video input, an audio input, or a touch input. The input device 1250 may include, for example, a keyboard, a mouse, a touchscreen, a microphone, a retinal scanner, and other devices that may detect the input from the user and transmit the detected input to the electronic apparatus 1200.

The output device 1260 may provide an output of the electronic apparatus 1200 to a user through a visual, auditory, or tactile channel. The output device 1260 may include, for example, s display panel for a liquid crystal display (LCD) and a light-emitting diode (LED)/organic light-emitting diode (OLED) display, a touchscreen, a speaker, a vibration generator, and other devices that may provide the output to the user. For example, in an example where the output device 1260 is a display panel, the display panel may include a display layer in which a plurality of hole regions through which external light is received and a plurality of pixel regions for outputting a display image are arranged.

The communication device 1270 may communicate with an external device through a wired or wireless network. The communication device 1270 may receive and transmit data or information from and to the external device.

As a non-exhaustive example only, an electronic apparatus 110 as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

The image acquisition apparatus, the electronic apparatus, and other apparatuses, devices, units, modules, and components described herein with respect to FIGS. 1-12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An image acquisition apparatus comprising:
   a display layer comprising hole regions through which external light is received and pixel regions arranged between the hole regions;
   an image sensor disposed under the display layer and configured to generate a raw image by sensing the external light received through the hole regions; and
   a processor configured to perform image processing on the raw image based on blur information based on an arrangement of the hole regions.

2. The image acquisition apparatus of claim 1, wherein each of the hole regions is arranged between a subset of the pixel regions in the display layer, and arranged such that a minimum distance between a boundary of a hole region and a boundary of a pixel region is within ⅕ of a diameter of the hole region.

3. The image acquisition apparatus of claim 1, wherein each of the hole regions is circular and the hole regions are of a same shape and size.

4. The image acquisition apparatus of claim 1, wherein each of the hole regions is greater in size than each of the pixel regions, and the hole regions are separated from each other by a wiring region therebetween.

5. The image acquisition apparatus of claim 1, wherein the processor is further configured to:
   generate a preprocessed image by performing image preprocessing on the raw image; and
   generate an enhanced image by performing image restoration on the preprocessed image.

6. The image acquisition apparatus of claim 5, wherein the processor is further configured to:
   generate the preprocessed image by performing either one or both of image preprocessing configured to apply a filter to the raw image and image preprocessing configured to perform image deconvolution on the raw image.

7. The image acquisition apparatus of claim 5, wherein the processor is further configured to:
   obtain the enhanced image using a neural network-based image restoration model configured to use the preprocessed image as an input.

8. The image acquisition apparatus of claim 1, wherein the blur information is determined based on any one or any combination of any two or more of a shape, size, depth, and interval of the hole regions.

9. The image acquisition apparatus of claim 1, wherein the blur information includes a point spread function (PSF) based on an arrangement structure of the hole regions.

10. The image acquisition apparatus of claim 9, wherein a spacing between centers of neighboring ones of the hole regions is substantially equal to a diameter of any one of the hole regions.

11. The image acquisition apparatus of claim 9, wherein a ratio of a spacing between centers of neighboring ones of the hole regions and a diameter of any one of the hole regions is substantially equal to 1.

12. An image acquisition apparatus comprising:
   a display layer comprising pixel regions and hole regions of a circular form configured to allow external light to be received therethrough; and
   an image sensor disposed under the display layer and configured to generate an image by sensing the external light,
   wherein each of the hole regions is arranged between a subset of the pixel regions in the display layer, and arranged such that a minimum distance between a boundary of a hole region and a boundary of a pixel region is within ⅕ of a diameter of the hole region,
   the hole regions and the pixel regions are alternately arranged in the display layer, and
   the hole regions are each of a same shape and size.

13. The image acquisition apparatus of claim 12, wherein neighboring hole regions are separated from each other with a wiring region for wiring therebetween, and four hole regions are arranged to surround a single pixel region.

14. An image sensor comprising:
   a processor configured to:
      generate a raw image based on external light received through hole regions comprised in a display layer; and
      perform image processing on the raw image based on blur information based on an arrangement of the hole regions.

15. The image sensor of claim 14, wherein each of the hole regions is arranged between a subset of pixel regions in the display layer, and arranged such that a minimum distance between a boundary of a hole region and a boundary of a pixel region is within ⅕ of a diameter of the hole region,
   each of the hole regions is greater in size than each of the pixel regions, and
   the hole regions are separated from each other.

16. An electronic apparatus comprising:
   a display panel comprising a display layer having hole regions through which external light is received and pixel regions for outputting a display image;
   an image sensor disposed under the display panel and configured to generate a raw image by sensing the external light;
   a processor configured to generate an enhanced image by performing image processing on the raw image based on blur information based on an arrangement of the hole regions; and
   a storage configured to store either one or both of the raw image and the enhanced image.

17. The electronic apparatus of claim 16, wherein each of the hole regions is arranged between a subset of the pixel regions in the display layer, and arranged such that a minimum distance between a boundary of a hole region and a boundary of a pixel region is within ⅕ of a diameter of the hole region, and
   each of the hole regions is greater in size than each of the pixel regions, and the hole regions are separated from each other.

18. A method of operating an image acquisition apparatus, comprising:
   obtaining a raw image by sensing external light received through hole regions arranged in a display layer using an image sensor disposed under the display layer; and
   performing image processing on the raw image based on blur information based on an arrangement of the hole regions.

19. The method of claim 18, wherein the performing of the image processing comprises:
   generating a preprocessed image by performing image preprocessing on the raw image; and
   generating an enhanced image by performing image restoration on the preprocessed image.

20. The method of claim 19, wherein the generating of the preprocessed image comprises:

generating the preprocessed image by performing either one or both of image preprocessing configured to apply a filter to the raw image and image preprocessing configured to perform image deconvolution on the raw image.

21. The method of claim 19, wherein the performing of the image processing comprises:
obtaining the enhanced image using a neural network-based image restoration model using the preprocessed image as an input.

22. A non-transitory computer-readable storage medium storing instructions that, when executed by one or more processors, cause the one or more processors to perform the method of claim 18.

23. An image processing apparatus comprising:
a display layer comprising hole regions and pixel regions arranged in a predetermined pattern;
an image sensor disposed under the display layer and configured to generate a raw image by capturing light through the hole regions; and
a processor configured to process the raw image based on blur information of the hole regions.

24. The image processing apparatus of claim 23, wherein the predetermined pattern comprises a subset of the hole regions surrounding each of the pixel regions.

25. The image processing apparatus of claim 23, wherein the predetermined pattern comprises the hole regions interleaved with the pixel regions.

26. The image processing apparatus of claim 24, wherein each of the hole regions is circular, the hole regions are of a same shape and size, and each of the hole regions is greater in size than each of the pixel regions.

27. The image processing apparatus of claim 24, wherein each of the hole regions is a micro-hole region.

28. The image processing apparatus of claim 26, wherein the blur information is determined based on any one or any combination of any two or more of a shape, size, depth, and interval of the hole regions, or a point spread function (PSF) based on the arrangement of the hole regions.

29. The image processing apparatus of claim 23, wherein the display layer is included in a display panel of an electronic apparatus.

30. The image processing apparatus of claim 23, wherein a spacing between centers of neighboring ones of the hole regions is substantially equal to a diameter of any one of the hole regions.

31. The image processing apparatus of claim 23, wherein a ratio of a spacing between centers of neighboring ones of the hole regions and a diameter of any one of the hole regions is substantially equal to 1.

32. The image processing apparatus of claim 23, wherein the processor is further configured to generate a preprocessed image by performing either one or both of image preprocessing configured to apply a filter to the raw image and image preprocessing configured to perform image deconvolution on the raw image.

33. The image processing apparatus of claim 32, wherein the raw image is a demosaiced red green blue (RGB) image.

34. The image processing apparatus of claim 32, wherein the processor is further configured to generate an enhanced image by performing image restoration on the preprocessed image.

35. The image processing apparatus of claim 34, wherein the enhanced image is generated using a neural network-based image restoration model configured to use the preprocessed image as an input.

36. The image processing apparatus of claim 34, further comprising an image signal processor (ISP) configured to perform any one or any combination of any two or more of noise reduction, white detect correction, red green blue (RGB) shading, RGB interpolation, color correction, and image format conversion on the enhanced image.

* * * * *